(12) United States Patent
Pronold et al.

(10) Patent No.: US 9,703,405 B2
(45) Date of Patent: Jul. 11, 2017

(54) APPARATUS FOR ASSISTING DATA COLLECTION AND/OR DATA PROCESSING

(71) Applicant: KRONES AG, Neutraubling (DE)

(72) Inventors: Timo Pronold, Regensburg (DE);
Johannes Böhm, Regensburg (DE);
Christina Traub, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/437,841

(22) PCT Filed: Oct. 1, 2013

(86) PCT No.: PCT/EP2013/070437
§ 371 (c)(1),
(2) Date: Apr. 23, 2015

(87) PCT Pub. No.: WO2014/063905
PCT Pub. Date: May 1, 2014

(65) Prior Publication Data
US 2015/0293618 A1    Oct. 15, 2015

(30) Foreign Application Priority Data
Oct. 25, 2012 (DE) .......................... 10 2012 219 565

(51) Int. Cl.
*G06F 3/041* (2006.01)
*G06F 3/042* (2006.01)
(Continued)

(52) U.S. Cl.
CPC .............. *G06F 3/041* (2013.01); *G06F 3/042* (2013.01); *G06F 3/0425* (2013.01);
(Continued)

(58) Field of Classification Search
CPC ........ G06F 3/041; G06F 3/042; G06F 3/0425; G06K 9/00201; G06Q 10/0875
See application file for complete search history.

(56) References Cited

U.S. PATENT DOCUMENTS 5,905,248 A * 5/1999 Russell ............. G06F 17/30879
235/462.15
6,491,225 B1   12/2002 Dvorkis et al.
(Continued)

FOREIGN PATENT DOCUMENTS

| CN | 1256772 A | 6/2000 |
|---|---|---|
| CN | 102163105 A | 8/2011 |

(Continued)

OTHER PUBLICATIONS

Search Report, German Application No. 10 2012 219 565.3, dated Mar. 27, 2013.
(Continued)

*Primary Examiner* — Ariel Balaoing
(74) *Attorney, Agent, or Firm* — Marshall, Gerstein & Borun LLP

(57) ABSTRACT

An apparatus, and a corresponding method, for assisting data collection and/or data processing for the operation of installations in the beverage-processing industry, the apparatus having an interactive touchscreen that has read capability and that can visually recognize two-dimensional and/or three-dimensional objects.

10 Claims, 3 Drawing Sheets

(51) Int. Cl.
*G06Q 10/08* (2012.01)
*G06K 9/00* (2006.01)

(52) U.S. Cl.
CPC ..... *G06K 9/00201* (2013.01); *G06Q 10/0875* (2013.01); *G06F 2203/04101* (2013.01)

(56) References Cited

U.S. PATENT DOCUMENTS

| | | | |
|---|---|---|---|
| 6,998,006 | B1 | 2/2006 | Kessler et al. |
| 7,159,771 | B2 | 1/2007 | Singgih et al. |
| 7,440,901 | B1 | 10/2008 | Dlott et al. |
| 7,905,392 | B2 | 3/2011 | Udd |
| 8,154,574 | B2 | 4/2012 | Neuhard et al. |
| 8,996,158 | B2 | 3/2015 | Hahn et al. |
| 2002/0080032 | A1 | 6/2002 | Smith et al. |
| 2010/0149119 | A1* | 6/2010 | Homma ............... G06F 3/044 345/173 |
| 2011/0043471 | A1 | 2/2011 | Senda et al. |
| 2012/0032364 | A1 | 2/2012 | Piana |
| 2014/0194030 | A1* | 7/2014 | Stucke, Jr. ........... A63H 3/50 446/73 |
| 2014/0284381 | A1* | 9/2014 | Pronold ............ G05B 19/0423 235/375 |
| 2014/0327628 | A1* | 11/2014 | Tijssen ............... G06F 3/0488 345/173 |

FOREIGN PATENT DOCUMENTS

| | | |
|---|---|---|
| CN | 102578807 A | 7/2012 |
| DE | 69725016 T2 | 6/2004 |
| DE | 60219754 T2 | 1/2008 |
| DE | 202007014281 U1 | 1/2008 |
| DE | 102009043671 A1 | 4/2011 |
| DE | 102010033170 A1 | 2/2012 |
| JP | 2000292534 A | 10/2000 |

OTHER PUBLICATIONS

International Search Report for application No. PCT/3P2013/070437, mailing date Mar. 5, 2014.

Maienschein: "I-OS-Produkte drangen in die Logistik", Feb. 17, 2012, XP055104469, http://www.mm-logistik.vogel.de/management-it/articles/353668/ Retrieved from the Internet: URL:http://www.mm-logistik.vogel.de/management-it/articles/353668/[retrieved on Feb. 26, 2014].

Pete Oppold et al: "Multi-Touch Table with Object Recognition Codename Plank Group 14: Table of Contents", Apr. 30, 2012 (Apr. 30, 2012), XP055104482, [retrieved on Feb. 26, 2014] p. 46-p. 53; figures 23, 61, 74, 75 p. 54-p. 55 p. 13-p. 23 p. 62-p. 67 p. 102-p. 114.

"ReacTIVision: a computer-vision framework for table-based tangible interaction", Tangible and Embedded Interaction Archive Proceedings of the 1st International Conference on Tangible and Embedded Interaction, New York, NY, USA, Feb. 15, 2007 (Feb. 15, 2007), pp. 69-74, XP002579861, ISBN: 978-1-59593-619-6.

First Office Action, The State Intellectual Property Office of the People's Republic of China, Application No. 201380056100.X, Issue Date Oct. 21, 2016.

* cited by examiner

APPARATUS FOR ASSISTING DATA COLLECTION AND/OR DATA PROCESSING

CROSS-REFERENCE TO RELATED APPLICATION

The present application is the United States national phase of International Patent Application No. PCT/EP2013/070437, filed Oct. 1, 2013, which application claims to German Application No. 10 2012 219 565.3, filed Oct. 25, 2012. The priority application is hereby incorporated by reference.

FIELD OF THE DISCLOSURE

The present disclosure relates to an apparatus and to a corresponding method for assisting data collection and/or data processing for the operation of installations in the beverage-processing industry.

BACKGROUND

Apparatuses for assisting data collection and/or data processing are sufficiently known. In particular portable touchscreens facilitating, as input aids, interaction of a user with an installation are used in many technical fields including the beverage-processing industry. These devices normally react to finger contact on the basis of a capacitive layer on the touchscreen. Hence, they are exclusively suitable for processing manual inputs of an operator. The use of unsuitable gloves (e.g. rubber gloves) may already suffice to prevent recognition of touching.

SUMMARY OF THE DISCLOSURE

It is therefore one aspect of the present disclosure to provide an apparatus for assisting data collection and/or data processing for the operation of installations in the beverage-processing industry, which is as versatile as possible, in particular with respect to objects with which said apparatus can interact, and which also allows easy handling by a user.

The apparatus for assisting data collection and/or data processing, e.g. for the operation of installations in the beverage-processing industry, includes that the apparatus has an interactive touchscreen that has read capability and that can visually recognize two-dimensional and/or three-dimensional objects. Configuring the apparatus with an interactive touchscreen that has read capability allows visual recognition of two-dimensional and three-dimensional objects, which may, in principle, be of an arbitrary nature, and to simultaneously process the acquired information on the touchscreen. According to one embodiment, the apparatus is either provided such that it is movable in the sense of a mobile device or it is provided in a stationary manner. If the apparatus is provided such that it is movable, it is e.g. possible to collect in a factory hall or in a warehouse information on objects, such as the stock on hand, or, in the case of malfunction, the information that the device in question is not in working order. When the apparatus is configured in a stationary manner, permanent monitoring of objects moved past the touchscreen can be executed. The touchscreen is thus able to recognize e.g. actual values of objects, such as dimensions, cutting positions or a print image, and compare them with the stored target state. In addition, a changeover of the machine or of the touchscreen operating as a sensor may be carried out by an operator.

According to another embodiment, the apparatus is able to read two-dimensional codes. The ability of the apparatus to read codes, such as bar codes, allows a flexible use of the apparatus also with respect to very large objects, which cannot fully be detected by the touchscreen but which are provided with a suitable identification or code.

According to a further embodiment, the apparatus is able to communicate with other terminals via a connection, preferably a wireless connection. The apparatus is thus able to e.g. control other devices or to obtain information from them.

According to another embodiment, the apparatus is able to interact with devices on the basis of the recognized objects, which are connected to the apparatus. This extensive networking allows certain procedures to be automated, e.g. the automatic dispatch of an order, when it turns out that the stock on hand dropped below a critical value.

According to one embodiment, the apparatus is able to display specific information based on the recognized objects and/or depending on the latter. An operator will thus be able, in particular when he uses a mobile device, to access the acquired information directly and to work with it. If, for example, the apparatus recognizes an object that has been put down at a wrong place, the user may e.g. arrange for said object to be removed, or he may use the apparatus for finding out where the actual place of destination of said object is.

Making use of e.g. this apparatus, a method of assisting data collection and/or data processing for the operation of installations in the beverage-processing industry can be realized, where by means of an apparatus, which comprises an interactive touchscreen that has read capability, two-dimensional and/or three-dimensional objects are visually recognized. By means of this method, it will be much easier for a user to interact with objects in his surroundings and to obtain information on these objects.

According to one embodiment, the method includes that two-dimensional codes are read. The reading of two-dimensional codes can be of advantage, especially in connection with the large apparatus and allows an unequivocal identification of the objects.

According to another embodiment, the recognition is initiated by positioning the object to be recognized at a distance in front of the touchscreen or by placing the object onto the touchscreen. The fact that recognition is automated makes it here much easier to handle the objects.

According to another embodiment, other devices are controlled, on the basis of the recognized object, through the apparatus used. Networking of this kind can substantially shorten operating procedures and thus cause an increase in efficiency.

According to a further embodiment, the method that the output of specific information on the touchscreen is triggered by the recognized object, said specific information being based on the recognized object and/or depending on the latter. For example, relevant information, such as circle or numbers of pieces in stock or the date of the last order, may be displayed for an object placed on the touchscreen, so as to obtain shorter information paths.

DETAILED DESCRIPTION

FIG. 1 shows an apparatus 100 for assisting data collection and/or data processing.

Figure 1A:
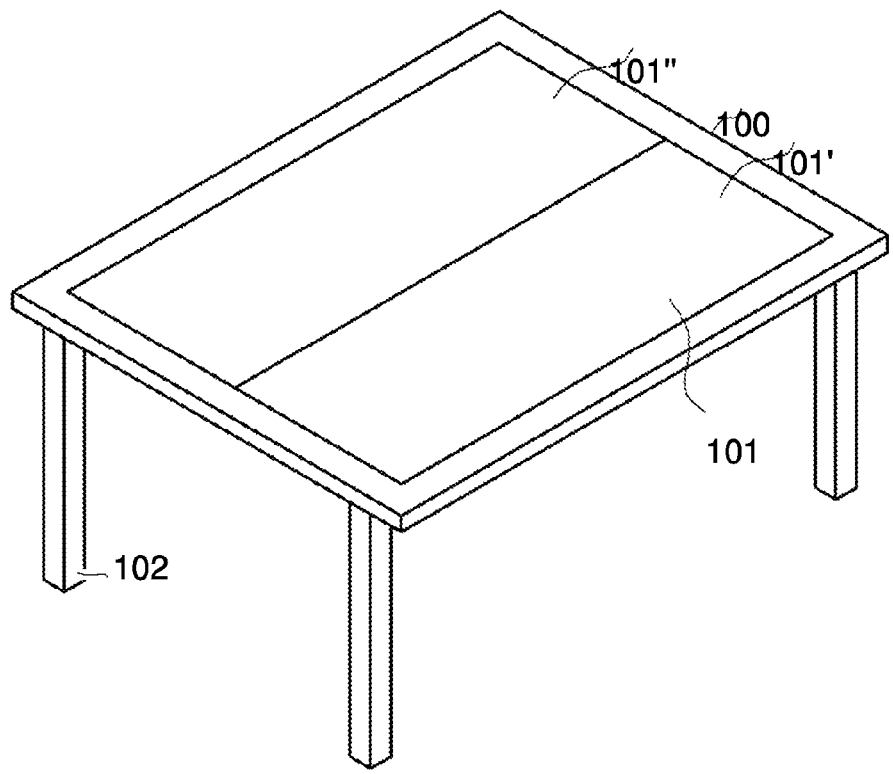
FIGS. 1*a* and 1*b* schematic representation of an apparatus according to the present disclosure.

FIG. 1a shows an embodiment of the apparatus 100 according to a stationary realization. To this end, the apparatus 100, which comprises at least an interactive touchscreen 101 that has read capability, may comprise e.g. legs 102 so that it can also be set up on the floor of a factory hall, by way of example. It is also imaginable to attach the apparatus 100 to a wall by means of a suspension device. Other possibilities of realizing the stationary apparatus 100 are given e.g. on a conveyor belt, where the touchscreen 101 having read capability would then be installed in a suitable manner for recognizing the objects conveyed on the conveyor belt and would also be provided for displaying additional information as well as possibilities of interactive input for an operator. For this purpose and also quite generally, the touchscreen may possibly be subdivided into different areas 101' and 101". One of these subareas 101' or 101" may then always be provided as an interactive input field, whereas the other subarea may be provided for optical recognition of objects located thereon or in close vicinity thereto. However, it is also possible to configure the whole touchscreen 101 such that it is capable of recognizing respective objects and adapted to be used as an interactive operating surface or display area.

Figure 1B:
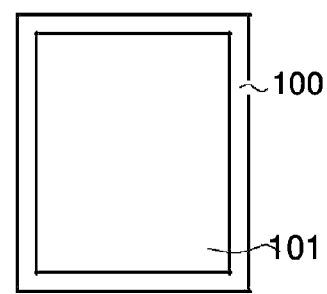

FIG. 1b shows the embodiment of an apparatus 100 according to the present disclosure in the sense of a mobile device, such as a tablet PC. Also in this case, the apparatus 100 comprises at least the interactive touchscreen 101 having read capability and, as regards the latter, it has the same features as the embodiment described with respect to FIG. 1a. In addition, it may be advantageous to provide the mobile device with additional interfaces which allow the connection of possibly required additional reading devices (scanner for infrared marks and the like) or processing units (mobile printers etc.). Also interfaces for connection to machines or other computers are of advantage. In addition, especially in cases where the apparatus 100 is configured as a mobile device, a wireless transmitter, which is here not shown, is provided, said wireless transmitter allowing the apparatus 100 to be connected via a network to other machines or other mobiles devices or to the Internet.

Figure 2:
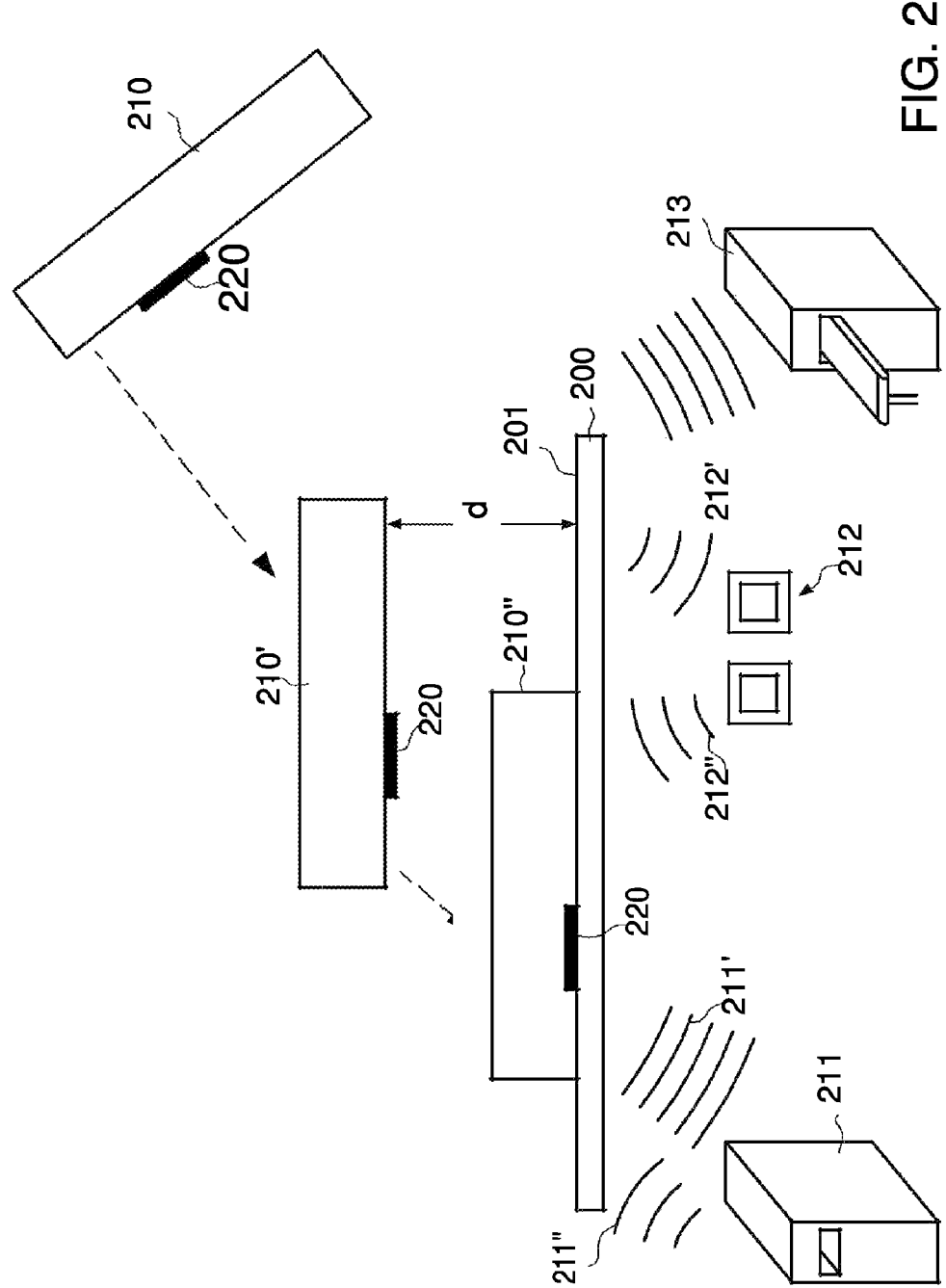
FIG. 2 schematic representation of the networking and interaction of an apparatus according to the present disclosure and its surroundings.

FIG. 2 shows an arrangement of the apparatus according to the present disclosure in a condition of use in relation to possible devices 211, 212, and 213 connected via the network. If an object 210, which may be provided with an additional identification or code 220, is positioned above the apparatus 200 according to the present disclosure such that it is positioned at position 210' above the touchscreen 201 at the depicted distance d from the latter or if it is placed onto the touchscreen, e.g. at a position 210", with the possibly provided code 220 facing in the direction of the touchscreen, the apparatus 200 will recognize this object. These objects may be machine parts, such as blow molds or cutting knives for cutting labels, or individual products, such as blown bottles or preforms or product packages, and also labels or the like. As long as the object has dimensions that are smaller than those of the touchscreen 201 (if the object in its entirety is to be recognized) or the code 220 can be recognized, the shape, size, weight and nature of the object 210 can be chosen at random. Depending on the object to be recognized and the effects intended by such recognition, the objects can either be positioned at a distance D above the touchscreen for recognition or they can be placed directly onto the latter. If, for example, a length of a label that has already been produced is to be compared with a target length for the purpose of adjusting operating parameters, such a label should preferably be placed directly onto the touchscreen 201 of the apparatus 200, since faulty measurements caused by kinks or similar deformations will be avoided in this way. If the object in question is, however, a compact element or if information is to be provided only by coarse graphic recognition, it will suffice to position the object at a distance D from the touchscreen 201.

When the object has been recognized on the basis of its shape, color or code, the apparatus 200 can contact other machines or devices either through a suitable wireless connection or through cable connections. For example, the apparatus 200 may exchange 211' information about the recognized object with a data memory 211 or it may request additional information 211" from this data memory 211. This requested additional information 211" may then e.g. be displayed on the touchscreen 201. This information may e.g. be the use of the recognized object, its price, the still available stock or further orders. Also other information is easily imaginable. Furthermore, the recognition of the object can be utilized for providing 212' e.g. other devices 212 with information on the recognized object. These other devices may then transmit 212" to the apparatus 200 e.g. corresponding information either on the same object or e.g. on objects or machines which are connected to said first-mentioned object. This exchange of information may e.g. be utilized for providing the operators of an apparatus 200 and a device 212 with further instructions. If, for example, the operator of apparatus 200 assigns to the recognized object the information that it is defective, a repairman equipped with the complementary device 212 can be informed that repair is needed or that the recognized object will be forwarded to him for the purpose of repair.

In addition, making use of the apparatus 200 and the recognized object, the operator will be able to instruct, e.g. in cases where label lengths have to be adjusted, a machine 213 to change specific system parameters so that the label length will be changed.

Figure 3:
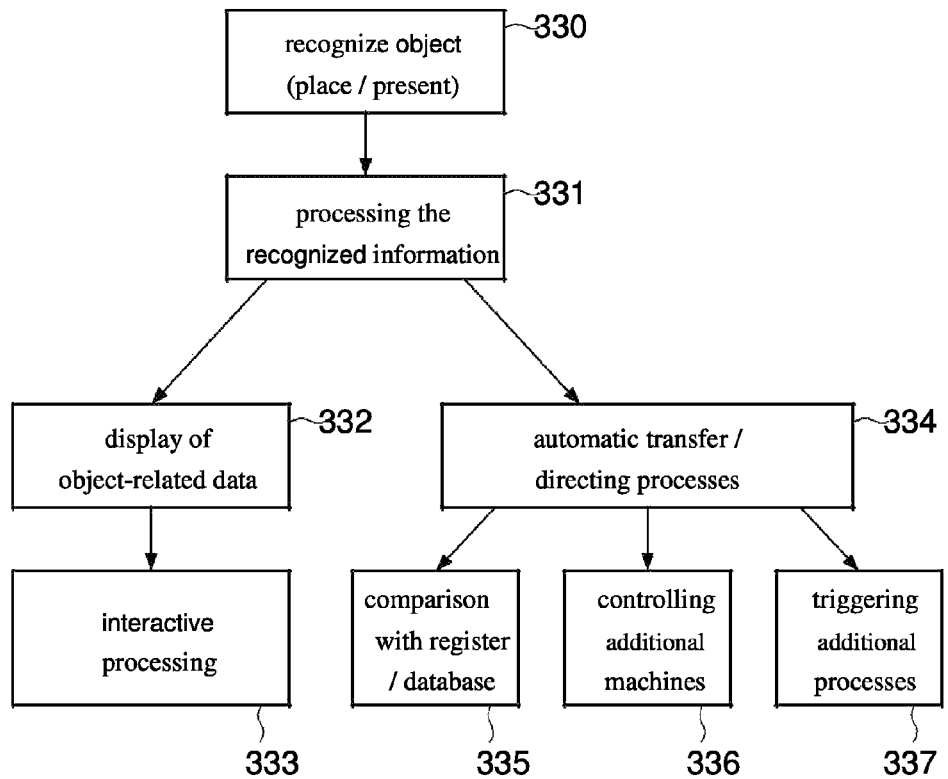
FIG. 3 schematic representation of an operating sequence according to the present disclosure.

FIG. 3 shows an exemplary process following the recognition of an object to be recognized. When the object has been recognized 330 by placing it onto the touchscreen or holding it in front of the same or by detecting a respective identification by means of an additionally required reading device, the information acquired is processed preferably automatically 331. Depending on the recognized information and possibly on an additional input through an operator, it will then be possible to either automatically transfer the information or to delegate further processes 334 or to display additional object-related data 332.

In the latter case, the apparatus according to the present disclosure can retrieve additional object-related data, e.g. from an internal memory or via a central database connected to the network. These object-related data may comprise an assignment of the recognized object to process sequences, or the indication of a stock item and of the price, or additional information. Also a retrieval of product information directly from machines producing the object (e.g. the temperature of blow molds during blow-molding of the recognized bottle) is imaginable. Subsequently, this information can be processed 333 interactively with the aid of the touchscreen. For example, if the recognized object is also an electronic device, information may be transmitted to the recognized object with the aid of drag and drop techniques, or quite generally via suitable menu items, or it may be downloaded therefrom. In addition, if the object-related data should comprise stocks, e.g. new orders may be placed, or a survey of the delivery orders may be examined, by way of example.

If automatic transfer or the additional processes 334 should have been chosen during processing of the information of the recognized object or through an input on the part of the operator, there are several possibilities. On the one hand, the information may be transferred to other devices or it may explicitly be sent to a central database 335 for comparing the acquired object-related information with a register or memory. In this way, e.g. label lengths or the coloration of bottles may be compared with data stored in the database. In addition, the acquired object-related information may be utilized, possibly in combination with other retrieved information, for controlling a machine, such as a blow molder or a labeler, and for changing e.g. process parameters. This is of interest especially in the beverage-processing industry, when different labels are to be used, e.g. in the case of a change from sort A to sort B. It is, for example, possible that the operator in question allows the newly provided label to be recognized by the apparatus according to the present disclosure and will then be able to instruct the respective machines to change the process parameters e.g. to the new label length or to change data, such as the amount of adhesive or the like, which may additionally be stored in a database. Furthermore, additional processes 337 may be triggered automatically. These processes comprise e.g. the display of documents or of instructions or of maintenance tools or, if the stock on hand should have reached a critical level, the re-ordering of respective devices or objects.

Figure 4:
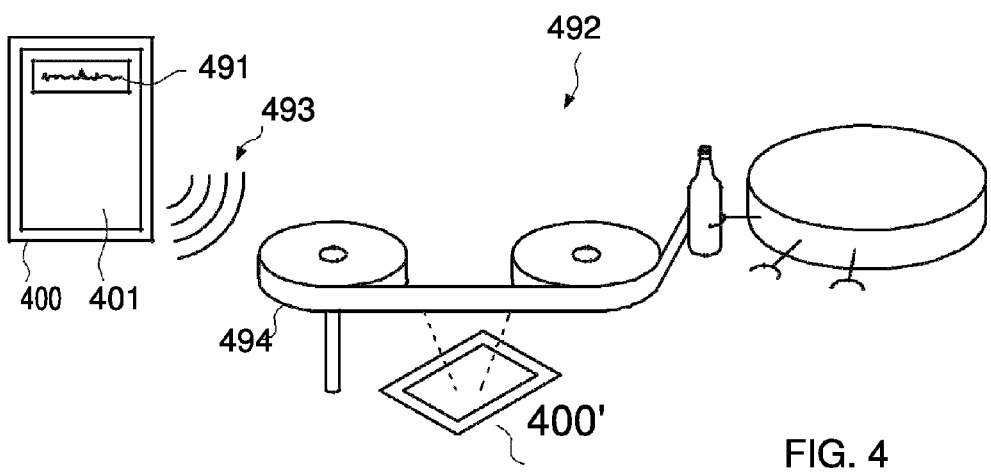
FIG. 4 schematic representation of a labeler that makes use of an apparatus according to the present disclosure.

A possible realization by means of a labeler 492 is shown in FIG. 4. If a changeover of the labels 491 to be applied is intended, an operator, who is equipped with an apparatus 400 according to the present disclosure, will first find out in a label stock (mobile terminal 400) which changeovers are necessary on the machine 491, or he will find that out by bringing a respective label from a stock to an apparatus 400 according to the present disclosure and by allowing it to be identified in this way (stationary apparatus) Likewise, an apparatus 400' may be provided in a stationary manner at the label feed unit 494 in such a way that the apparatus 400' will be able to unequivocally recognize the labels and to thus process relevant data.

The necessary changeovers comprise e.g. the time intervals, which are necessary for actuating the cutting knife used for cutting label rolls, or the changeover to a new label roll. The selection of necessary changeovers takes place either after the recognition of the label 491 through an input on the part of the user or is independently accomplished by the apparatus 400 or 400' according to the present disclosure, e.g. through a comparison of data of the previously used label and the new label. This allows a partially automated adaptation (the user operates the apparatus 400 and/or ensures that the object to be recognized can be recognized by the apparatus 400) or an automated adaptation (a stationary apparatus 400' according to the present disclosure is arranged such that it is able to recognize the labels) of the labeler 492 to a new label, and this will substantially facilitate the work that has to be done.

The invention claimed is:

1. An apparatus for assisting data collection and/or data processing for the operation of installations in the beverage-processing industry, comprising:
   an interactive touchscreen, wherein the touchscreen has read capability and is adapted to visually recognize two-dimensional and/or three-dimensional objects; and
   wherein the apparatus is able to control, on the basis of the recognized objects, devices connected to the apparatus, and at least one of the recognized objects is a recognized label and the information on the recognized label is compared with respect to a label length with data stored in a database;
   wherein the apparatus is adapted for recognizing a new label to be used and to instruct a labeler to change process parameters to a new label length or to data stored in the database.

2. The apparatus according to claim 1, and the apparatus is provided so as to be one of movable in the sense of a mobile device, or provided in a stationary manner.

3. The apparatus according to claim 1, and the apparatus is able to read two-dimensional codes.

4. The apparatus according to claim 1, and the apparatus is able to communicate with other terminals via a connection.

5. The apparatus according to claim 4, and the connection is a wireless connection.

6. The apparatus according to claim 1, and the apparatus is able to display specific information based on the recognized objects.

7. A method of assisting data collection and/or data processing for the operation of installations in the beverage-processing industry, comprising:
   utilizing an apparatus having an interactive touchscreen, the touchscreen having read capability to visually recognize two-dimensional and/or three-dimensional objects;
   controlling other devices on the basis of the recognized object, through the apparatus, and wherein at least one of the recognized objects is a recognized label;
   comparing the information on the recognized label with respect to a label length with data stored in a database; and
   recognizing a new label to be used and to instruct a labeler to change process parameters to a new label length or to data stored in the database.

8. The method according to claim 7, and utilizing the apparatus to read two-dimensional codes.

9. The method according to claim 7, and the visual recognition is initiated by positioning the object to be recognized at a distance in front of the touchscreen or by placing it onto the touchscreen.

10. The method according to claim 7, and triggering the output of specific information on the touchscreen by the recognized object, the specific information being based on the recognized object.

* * * * *